Dec. 4, 1962     A. L. NIELSEN     3,067,302
HYDRO-STATICALLY AND DYNAMICALLY RESPONSIVE
CONTROL FOR SUMP PUMPS AND THE LIKE
Filed June 1, 1959

INVENTOR.
AXEL L. NIELSEN
BY Whittemore Hulbert
Belknap
ATTORNEYS

# United States Patent Office 3,067,302
Patented Dec. 4, 1962

3,067,302
HYDRO-STATICALLY AND DYNAMICALLY RE-
SPONSIVE CONTROL FOR SUMP PUMPS AND
THE LIKE
Axel L. Nielsen, 1316 E. Elza, Hazel Park, Mich.
Filed June 1, 1959, Ser. No. 817,352
10 Claims. (Cl. 200—81.5)

The present invention relates to an improved and simplified control for a sump pump or like pump which functions automatically to maintain at a predetermined level liquid collected in a sump or like accumulator or receiver. The control embodies an electrical switch unit operating in general accordance with my Patent 2,834,845 of May 13, 1958, but differs from the control of that patent in that it does not rely for actuation of the switch unit by any type of mechanical float or equivalent device. In this sense, the control of the invention is an improvement over what is shown in my copending application Serial No. 724,193, filed March 26, 1958 (now Letters Patent No. 3,002,064 of September 26, 1961), in which an electrical control is operated to initiate and then maintain or extend the time interval of pumping in response to both hydrostatic and hydrodynamic forces.

It is an object of the present invention, in general, to provide an improved sump pump control operating in response to hydrostatic and hydrodynamic or kinetic pressure effects at or adjacent the pump intake level and in its discharge line respectively, which is of greatly simplified and lessened cost of production, as compared, for example, with the control of my identified copending application, as well as other known types of pump control which operate in response to corresponding effects; yet which is very compact and efficient and may be easily and quickly adjusted to vary the time of cut-off of pumping, once hydrostatically commenced, over a wide range.

More specifically, it is an object to provide a control as described, featuring a fluid pressure responsive diaphragm acting in one direction to operate an electrical switch on one side thereof in response to pressure on the opposite side thereof. The diaphragm is subject on the last named side to hydrostatic pressure in varying degree, depending upon the level of liquid with which said side is communicated, as by immersion; and said side is also in communication, preferably as directly as possible, with the discharge line of the pump. Thus, the hydrostatic pressure effective to cause the diaphragm to initially close the switch under a predetermined hydrostatic head is augmented, once the pump is in operation, by discharge line kenetic energy to maintain the switch closed, and pumping to continue for any desired time interval until the level of the liquid has been reduced as desired, usually to the level of the pump intake.

A further specific object is to provide a control in accordance with the preceding paragraph, in which the period of pumping is determined by variably controlling as desired the dynamic force of application of discharge line pressure to the diaphragm. In accordance with the invention, this is accomplished in an extremely simple and inexpensive manner by adjustably throttling the flow of discharge line liquid to a chamber of which the diaphragm constitutes one side, the discharge surging against the diaphragm. Thus with a maximum throttling action the diaphragm is subject in a minimum degree to the force-augmenting, dynamic action of the discharge, and the period during which the diaphragm maintains the switch closed is correspondingly small. The degree of throttling may be nicely adjusted in relation to the capacity of the diaphragm chamber to drain, as through its hydrostatic pressure opening or openings, to produce the desired time of cut-off.

Yet another object is to provide a control as described, in which the throttling action is provided by a needle type valve element governing an intake opening or passage from the pump discharge line to the diaphragm chamber, thereby enabling a maximum dynamic surge effect when the needle valve is fully open (and a corresponding maximum period of pumping prior to shut-off), to a minimum or zero effect, as with the needle valve closed, in which the period of pumping is a minimum determined solely by hydrostatic force.

The foregoing as well as other objects will become more apparent as this description proceeds, especially when considered in connection with the accompanying drawing illustrating the invention wherein.

Figure 1:
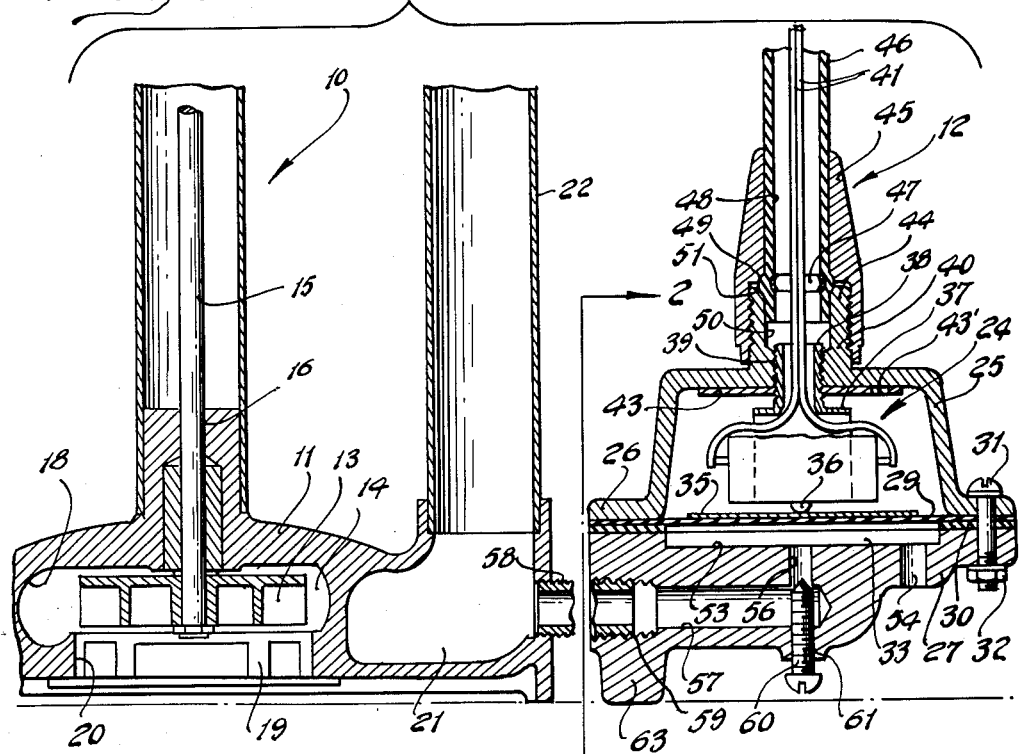
FIG. 1 is a fragmentary view in vertical axial section, as along line 1—1 of FIG. 2, through a typical sump pump having the improved control of the invention employed in conjunction therewith.
Figure 2:
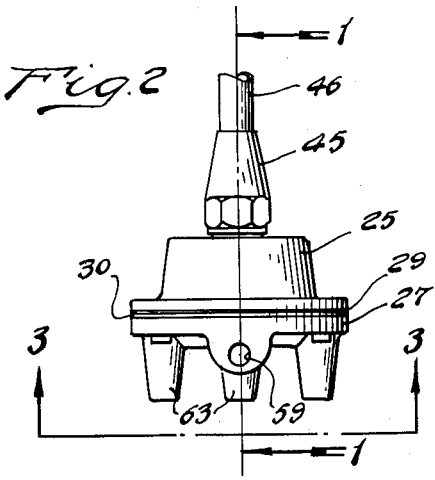
FIG. 2 is a fragmentary view in side elevation of the control, as from the line 2—2 of FIG. 1.
Figure 3:
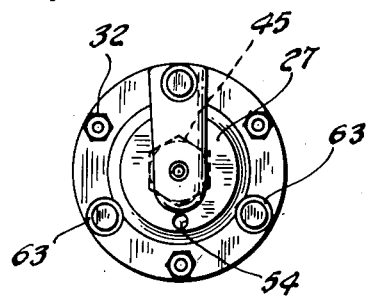
FIG. 3 is a bottom plan view of the control.

As illustrated in FIG. 1 of the drawing, the reference numeral 10 generally designates a conventional sum pump or equivalent pump having an impeller housing 11 adapted to be disposed in a sump or equivalent liquid accumulator or receiver, and operated to maintain the level in the latter as desired, preferably as low as possible. The reference numeral 12 generally designates the improved control of the invention.

The pump 10 includes a conventional type of rotary impeller 13 operating in a bottom pumping chamber 14 in housing 11 and secured on a vertical shaft 15 suitably journaled as at 16 in the housing. Pumping chamber 14 may be considered to include a volute portion 18 to which liquid flows from the exterior of the housing, as through a suitable trap 19 applied in a conventional manner to a circular axial opening 20 in the bottom of the housing. Impeller 13 discharges liquid to a discharge passage 21 formed in the housing 11, thence through an upright discharge pipe or conduit 22 to a suitable disposal point.

Pump shaft 15 is driven by a motor (not shown) under electrical control of a suitable, normally open switch 24 of control 12, all as described in my patent and copending application identified above, hence not here requiring further illustration or description.

The control comprises an upper housing part or bonnet 25 of domed cross section having an annular, radially extending flange 26 by which it is secured to a lower housing part or base 27, preferably in the form of a suitable cored casting. A flexible diaphragm 29 of synthetic-impregnated fabric or like material suitable for the purpose is marginally clamped between the housing flange 26 and base 27, with an appropriate sealing gasket or washer 30 interposed between the diaphragm and base, by means of a series of bolts or studs 31, thereby defining between the diaphragm 29 and housing base 27 a hydrostatic and hydrodynamic pressure chamber 33 in which the liquid pressure forces operate to control the diaphragm and switch 24, in a manner hereinafter described.

Diaphragm 29 is equipped on its upper surface facing switch 24 with a pressure plate 35 adapted to contact the usual control button 36 of switch 24, all as described in my patent and copending application. Switch 24 is adjustably carried by a mounting fixture or bracket 37 which includes a tubular part 38 externally threaded to engage at 39 a centrally apertured upright boss 40 of the housing bonnet 25; and electrical leads 41 connected to switch 24 are brought upwardly through the tubular part 38 and boss 40.

Thus, in order to adjust the position of switch button 36 relative to the diaphragm pressure plate 35, and thus variably determine the time at which the normally open switch is closed by the diaphragm under hydrostatic pressure in chamber 33, it is only necessary to rotatably adjust the mounting fixture 37 and its tubular part 38 relative to the housing bonnet 25. As thus adjusted, the switch 24 is locked in place by a large diameter locking disk 43 which is threadedly engaged with the tubular part 38 and engages the lower surface of bonnet 25 when taken up. Disk 43 may be provided with one or more holes 43' to which a tool may be applied to tap and rotate the disk to a tightened condition.

The upper end of housing boss 40 is externally threaded at 44 to receive a tubular connector 45, by means of which a union is effected between the housing and a vertically elongated tubular shield 46 of rubber or the like, through which the wiring leads 41 are brought upwardly to the pump operating motor (not shown).

In order to effect the union referred to above, I preferably insert within the lower end of the tube 46 a clamp ring 47 of convexly rounded cross section. Adjacent the lower end of its bore 48, in which the shield tube 46 is received, the connector 45 is formed to provide an annular arcuate clamp seat 49; while the housing boss 44 has its bore 50 in which tube 46 is received formed to provide a similar rounded annular clamp 51. It is seen that, with the connector 45 threadedly taken up tight on the boss 44, the tube 46 is clamped between the annular seats 49, 51, and the convex sectioned clamp ring 47 on its interior, thus affording a simple and effective liquid tight seal set up at the joint or union of the shield tube 46 and the control housing constituted by the upper and lower parts 25, 27.

The lower housing part or base 27 is formed on its top to provide a circular recess 53 with which diaphragm 29 coacts in defining the pressure chamber 33 and to provide one or more hydrostatic pressure and drain ports or passages 54 downwardly communicating the chamber 33 with the exterior of control 12. A head of hydrostatic pressure corresponding to the level of liquid in the sump is effective on the diaphragm 29 through ports 54, to cause the diaphragm to close switch 24 at a liquid level determined by the vertical adjustment of switch 24, by the provisions described above.

Housing base 27 is also formed to provide a central upright port or passage 56 at the center of recess 53 downwardly communicating with a lateral intake passage or bore 57 which opens to the exterior of the control; and a suitable nipple or like fitting 58 threadedly received at 59 in base 27 is employed to communicate the intake passage 57 with the discharge passage 21 of pump housing 11. Nipple 58 is shown as similarly threaded into the pump housing.

Finally, an externally adjustable needle valve 60 in the form of a round head screw is threaded at 61 into the bottom of housing base 27 in alignment with the port or passage 56. This valve is adjustable as desired to regulate the area of effective intake opening to the port 56, and thus determine the hydrodynamic surge force exerted in pressure chamber 33 and derived from the discharge of pump 10 through passage 57. Suitable supporting legs 63 cast integral with base 27 serve to support the control 12 properly adjacent and relative to the pump 10.

In operation it is seen that, with the switch mounting fixture 37 appropriately adjusted within the housing bonnet 25 to determine the level at which the hydrostatic force of liquid acting on diaphragm 29 will cause switch button 36 to be operated to close the switch 24, the liquid discharged by pump impeller 13 to passage 21 is effective through nipple 58, passage 57 and valved and throttled port 56 to impose an additional hydrodynamic or kinetic force of surging liquid on the diaphragm, which will maintain the pump in operation following the initial switch closure. The duration of pumping time is a function of the combined hydrostatic and dynamic or kinetic forces thus acting on diaphragm 29; and is controlled in accordance with the variable throttling of the discharge liquid by adjustment of needle valve 60.

Thus, with the latter fully backed off, the full area of port 56 is exposed, as may be desirable when a relatively low pumping head is to be overcome. Pumping will continue for the maximum period until the liquid level is dropped to that of the trap 19. With needle valve 60 fully advanced to close off port 56, the pumping time is determined solely by the hydrostatic pressure in chamber 33, as in turn determined by the adjustment of switch 24. In any setting of needle valve 60 between these maximum open and closed positions, the pumping proceeds until a pump shut off point, which may be nicely determined in accordance with the needle valve setting. The setting may readily be made such that the discharge pressure surge action, in relation to the capacity of drain port or ports 54 to void liquid, will allow pumping to continue until the sump is practically dry.

It is seen that the invention affords a very simple and inexpensive control, having a minimum of parts, as compared, for example, with the hydrostatic-hydrodynamic control of my copending application identified above. It may be produced and sold as a combination with the pump 10, or may be marketed as an attachment for use with an installed sump pump. It is rugged in construction, yet is surprisingly sensitive in response to the fluid pressure manifestations referred to above, and nicely adjustable as to its mechanical features to permit a desired setting of cut-in and cut-off times.

What I claim as my invention is:

1. A pump motor control having intake means adapted to be immersed in a liquid to be pumped, comprising a housing having therein a pressure-responsive element, a motor control unit mounted on one side of said element and actuated by said element upon pressure responsive actuation of the latter, said housing having means to subject the opposite side of said element to a hydrostatic pressure at the zone of immersion of said intake means to initiate actuation of said control unit and also having a passage to communicate said opposite side with a pump discharge pressure and to apply said last named pressure to said element as a kinetic force acting locally on said element in said housing, and thus to maintain actuation by the latter of said control unit, and means to adjustably throttle said passage and thereby adjust said forces to vary the time interval of such maintenances.

2. A pump motor control having intake means adapted to be immersed in a liquid to be pumped, comprising a housing having therein a pressure-responsive element, a motor control unit mounted on one side of said element and actuated by said element upon pressure responsive actuation of the latter, said housing having means to subject the opposite side of said element to a hydrostatic pressure at the zone of immersion of said intake means to initiate actuation of said control unit and also having a passage to communicate said opposite side with a pump discharge pressure and to apply said last named pressure to said element as a kinetic force acting locally on said element in said housing, and thus to maintain actuation by the latter of said control unit, and means operable from the exterior of said housing to adjustably throttle said passage and thereby adjust said forces to vary the time interval of such maintenances.

3. A pump motor control having intake means adapted to be immersed in a liquid to be pumped, comprising a housing having therein a pressure-responsive element, a motor control unit mounted on one side of said element and actuated by said element upon pressure responsive actuation of the latter, said housing having means to subject the opposite side of said element to a hydrostatic pressure at the zone of immersion of said intake means to initiate actuation of said control unit and also having a passage to communicate said opposite side with a pump discharge pressure and to apply said last named pressure to said element as a kinetic force acting locally on said element in said housing, and thus to maintain actuation by the latter of said control unit, and means operable from the exterior of said housing to adjustably throttle said passage and thereby adjust said forces to vary the time interval of such maintenances, comprising an adjustable needle valve threadedly engaged with the housing and controlling a portion of said passage.

4. A control for a motor operating a sump or like liquid pump having intake means adapted to be immersed in a liquid to be pumped, comprising a housing having therein a pressure-responsive element, a motor control unit mounted on one side of said element and actuated by said element upon pressure responsive actuation of the latter, said housing having means through which the opposite side of said element is communicated at the zone of immersion of said intake means with hydrostatic pressure to initiate actuation of said control unit, and also having a passage to communicate said opposite side with the discharge of the pump to direct an intake flow of pump discharge liquid to and against said element at a local point thereon, thereby to maintain actuation of said control unit by said element under the kinetic force of said flow, a needle valve movably mounted by said housing for adjustment relative to said discharge passage to variably throttle said flow at the latter to adjust said kinetic force, and means to adjustably move said needle valve from the exterior of said housing.

5. A control for a motor operating a sump or like liquid pump having intake means adapted to be immersed in a liquid to be pumped, comprising a housing having a pressure chamber therein defined at least in part by a flexible, pressure-responsive diaphragm, a motor control unit mounted on the side of said diaphragm opposite said pressure chamber and actuated by said diaphragm upon pressure responsive actuation of the latter, said housing having means through which said pressure chamber is communicated at the zone of immersion of said intake means with hydrostatic pressure to initiate actuation of said control unit, and also having a passage communicating with said pressure chamber and the discharge of the pump, said passage being disposed to direct an intake flow of pump discharge liquid to said pressure chamber and to and against the pressure chamber side of said diaphragm at a local point thereon, thereby to maintain actuation of said control unit by said diaphragm under the kinetic force of said flow, and means coacting with and adjustable relative to said discharge passage to adjustably throttle said flow at the latter to adjust said kinetic force and thereby vary the time interval of such maintenance, comprising a valve member threadedly adjustable relative to said housing and normally in fixed relation to said discharge passage, said valve member upon threaded adjustment acting to vary the effective flow area of said passage in accordance with its adjustment.

6. A control for a motor operating a sump or like liquid pump having intake means adapted to be immersed in a liquid to be pumped, comprising a housing having therein a pressure-responsive element, a motor control unit mounted on one side of said element and actuated by said element upon pressure responsive actuation of the latter, said housing having means through which the opposite side of said element is communicated at the zone of immersion of said intake means with hydrostatic pressure to initiate said actuation, and also having a passage to communicate said opposite side with the discharge of the pump to direct an intake flow of pump discharge liquid to said element, thereby to maintain actuation of said control unit by said element under the kinetic force of said flow, and means coacting with and adjustable relative to said discharge passage to adjustably throttle said flow at the latter, thus to adjust said kinetic force and thereby vary the time interval of such maintenance.

7. A control for a motor operating a sump or like liquid pump having intake means adapted to be immersed in a liquid to be pumped, comprising a housing having a pressure chamber therein defined at least in part by a flexible, pressure-responsive diaphragm, a motor control unit mounted on the side of said diaphragm opposite said pressure chamber and actuated by said diaphragm upon pressure responsive actuation of the latter, said housing having means through which said pressure chamber is communicated at the zone of the immersion of said intake means with hydrostatic pressure to initiate said actuation, and also having a passage to communicate with said pressure chamber and the discharge of the pump to direct an intake flow of pump discharge liquid to said pressure chamber, thereby to maintain actuation of said control unit by said diaphragm under the kinetic force of said flow, and means coacting with and adjustable relative to said discharge passage to adjustably throttle said flow at the latter, thus to adjust said kinetic force and thereby vary the time interval of such maintenance.

8. A control for a motor operating a sump or like liquid pump having intake means adapted to be immersed in a liquid to be pumped, comprising a housing having a pressure chamber therein defined at least in part by a flexible, pressure-responsive diaphragm, a motor control unit mounted on the side of said diaphragm opposite said pressure chamber and actuated by said diaphragm upon pressure responsive actuation of the latter, said housing having means through which said pressure chamber is communicated at the zone of immersion of said intake means with hydrostatic pressure to initiate said actuation, and also having a passage to communicate with said pressure chamber and the discharge of the pump, said passage being disposed to direct an intake flow of pump discharge liquid to said pressure chamber and against said diaphragm, thereby to maintain actuation of said control unit by said diaphragm under the kinetic force of said flow, and means coacting with and adjustable relative to said discharge passage to adjustably throttle said flow at the latter, thus to adjust said kinetic force and thereby vary the time interval of such maintenance.

9. A control for motor operating a sump or like liquid pump having intake means adapted to be immersed in a liquid to be pumped, comprising a housing having a pressure chamber therein defined at least in part by a flexible, pressure-responsive diaphragm, a motor control unit mounted on the side of said diaphragm opposite said pressure chamber and actuated by said diaphragm upon pressure responsive actuation of the latter, said housing having means through which said pressure chamber is communicated at the zone of immersion of said intake means with hydrostatic pressure to initiate said actuation, and also having a passage communicating with said pressure chamber and the discharge of the pump, said passage being disposed to direct an intake flow of pump discharge liquid to said pressure chamber and against said diaphragm, thereby to maintain actuation of said control unit by said diaphragm under the kinetic force of said flow, and means coacting with and adjustable relative to said discharge passage to adjustably throttle said flow at the latter, thus to adjust said kinetic force and thereby vary the time interval of such maintenance, comprising a valve member adjustable relative to said housing and acting to vary the effective flow area of said passage in accordance with its adjustment.

10. A control for a motor operating a sump or like liquid pump having intake means adapted to be immersed in a liquid to be pumped, comprising a housing having a pressure chamber therein defined at least in part by a flexible, pressure-responsive diaphragm, a motor control unit mounted on the side of said diaphragm opposite said pressure chamber and actuated by said diaphragm upon pressure responsive actuation of the latter, said housing having means through which said pressure chamber is communicated at the zone of immersion of said intake means with said pressure chamber and the discharge of the pump, said passage being disposed to direct an intake flow of pump discharge liquid to said pressure chamber and against said diaphragm, thereby to maintain actuation of said control unit by said diaphragm under the kinetic force of said flow, and means coacting with and adjustably relative to said discharge passage to adjustably throttle said flow at the latter, thus to adjust said kinetic force and thereby vary the time interval of such maintenance, comprising a valve member threaded in said housing and acting to vary the effective flow area of said passage in accordance with its threaded adjustment.

References Cited in the file of this patent

UNITED STATES PATENTS

| | | |
|---|---|---|
| 2,103,214 | Coffin | Dec. 21, 1937 |
| 2,130,607 | Aikman | Sept. 20, 1938 |
| 2,411,796 | Leupold | Nov. 26, 1946 |
| 2,488,506 | Bernhardt | Nov. 15, 1949 |
| 2,600,618 | Cobb et al. | June 17, 1952 |
| 2,635,546 | Enyeart et al. | Apr. 21, 1953 |
| 2,704,551 | Ralston | Mar. 22, 1955 |
| 2,730,591 | Nielsen | Jan. 10, 1956 |
| 2,804,516 | Staak | Aug. 27, 1957 |